United States Patent Office 3,502,011
Patented Mar. 24, 1970

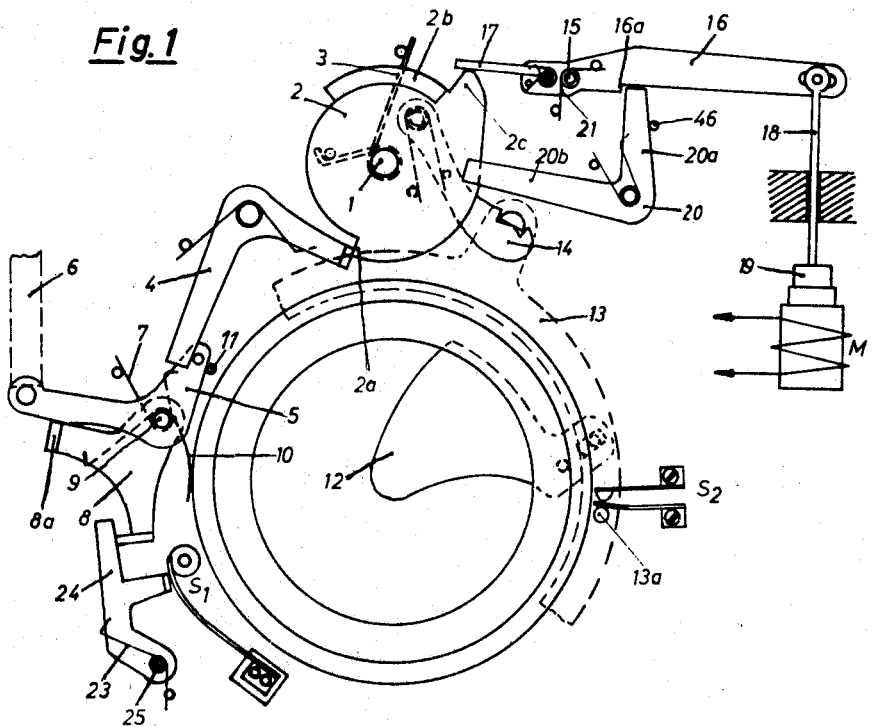

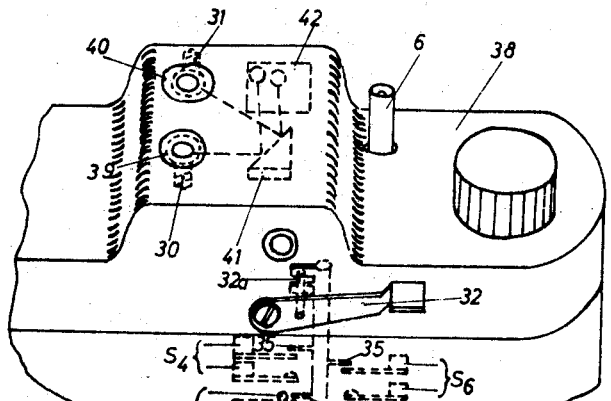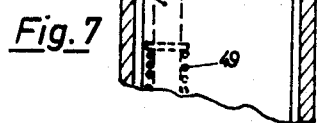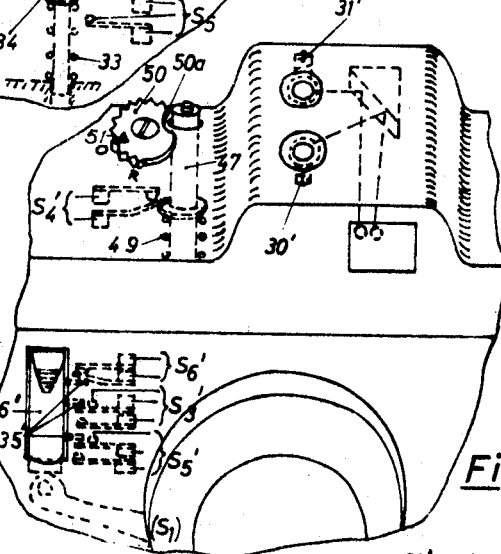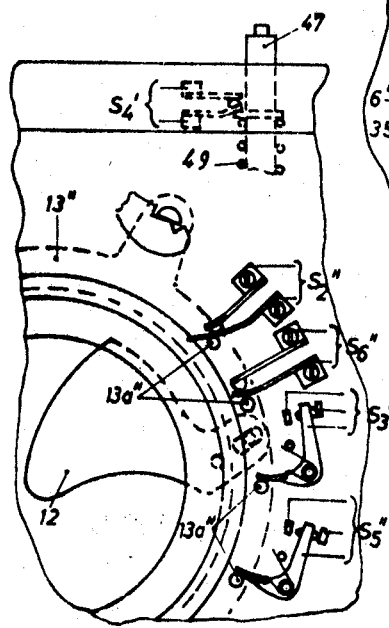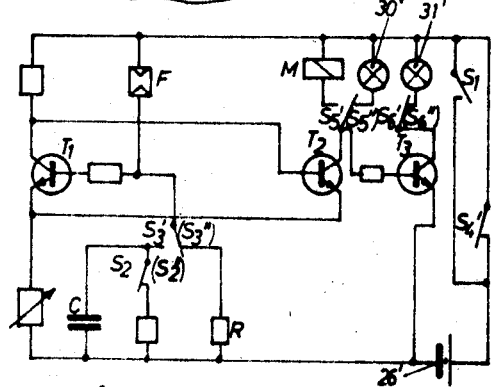
INVENTORS
Waldemar T. Rentschler
Winfried Espig
BY Amster & Rothstein
ATTERNEY

3,502,011
PHOTOGRAPHIC CAMERAS WITH AN EXPOSURE INDICATING CIRCUIT
Waldemar T. Rentschler and Winfried Espig, Calmbach, Black Forest, Germany, assignors to Prontor-Werk Alfred Gauthier G.m.b.H., Calmbach, Black Forest, Germany
Filed Mar. 4, 1966, Ser. No. 532,009
Claims priority, application Germany, Mar. 19, 1965, P 36,324
Int. Cl. G01j 1/42; G03b 7/08
U.S. Cl. 95—10
10 Claims

ABSTRACT OF THE DISCLOSURE

A photographic camera shutter which is provided with an electronic timing device. A photoelectric resistor controls the timing of the shutter and is provided with an indicating device in the form of two lamps, one is actuated for an exposure time lying below a predetermined time limit, and the other is actuated for an exposure time lying about said limit.

---

The invention concerns a photographic camera shutter which has an electronic timing circuit controllable by means of a light responsive device.

Unlike cameras which are provided with an automatic exposure system controlled by a moving-coil instrument, cameras of the type described above have the disadvantage that no indication is given to the user as to what exposure time will result from the momentarily prevailing lighting conditions when taking a photograph.

To remedy this deficiency it has already been proposed to equip the camera in addition to an electronic timing circuit, with a galvanometer, which by means of a switch is temporarily connected to a photoelectric cell of the timing circuit in order to give the person taking a photograph a pointer deflection indicating the required exposure time. By means of this device the photographer is informed in advance of the exposure time value to be set during exposure on account of the lighting conditions, but such a measure cannot be regarded as satisfactory for economical reasons, since the mere provision of an exposure time value indicator only serving to indicate the exposure time value in addition to the electronic exposure control device does not justify the expenditure on the additional meter. Again, there is the additional space requirement resulting from the installation of the exposure meter in the camera.

To eliminate the disadvantages inherent in such an indicating device, it has already been proposed, in a camera having a shutter timing controlled electronically, in dependence upon the lighting, to arrange in the circuit of the charging capacitor of the electronic time forming device and the electromagnet associated therewith a mechanism serving to control a lamp circuit, by means of which mechanism a digital indication is given before taking a photograph as to whether the exposure time required by the prevailing lighting conditions lies below or above a certain exposure time limit value.

The object of the present invention is to provide an exposure time value indicating device which is simple, with a saving in cost and space, and which is reliable in operation.

This object is attained in accordance with the invention by the arrangement of an indicating device operating on an electronic basis and including at least one lamp, which device is adapted to be connected in the circuit of the electronic shutter timer by means of a switch arrangement and shows whether the exposure time required by the prevailing light conditions lies below a certain exposure time limit value.

According to a further aspect of the invention, the indicating device is provided with a resistance connected to the photoelectric resistance of the shutter timer via a switch, which resistance together with the photo-resistance forms a potential divider to the central tap of which at least one control transistor is connected.

In order to give a clear indication before exposure, provision is made for the indicating device to include two lamps each of which is connected in the circuit of a transistor, these being switched on in dependence upon the state of the control transistor, one lamp lighting up with an exposure time lying below the exposure time limit value, the other lamp lighting up with an exposure time lying over the limit value. A structural and functional simplification is obtained by making some of the transistors part of the shutter timing circuit.

To give a perfectly clear indication of the exposure time value set during exposure, it is further proposed in accordance with the invention for the indicating device to have lamps of different colours, for example, red and green. Preferably the indicating lamps are visible in an observation window provided on the camera, or in the viewfinder.

A simple indication to be used optionally before exposure is obtained according to a further feature of the invention by the fact that the switch arrangement serving to switch on the indicating device is actuated by a separate test button on the camera. To ensure reliable operation this test button connects the resistance in the circuit of the switch serving the electronic timing circuit and also connects both lamps to the collector circuits of the auxiliary transistors and hence to the current source of the timing circuit.

To ensure that the result of the measurement is observed reliably by the person taking the photograph before exposure, even if he is not paying special attention to the indication, a further proposal of the invention provides a switch arrangement serving the control of the lamp circuit which causes the indicating lamps to light up permanently, this circuit being broken only for the duration of the exposure. Breaking the lamp circuit and switching on the electronic timing circuit may conveniently be effected automatically, e.g. in dependence upon the actuation of the camera release. In order to ensure a satisfactory action of the electronic timing circuit provision is made for the actuation of the change-over to be effected by means of a portion of the shutter blade driving mechanism, e.g. by the shutter blade driving ring in the first phase of the shutter opening movement, and before the electronic timing circuit commences to operate.

According to a further feature of the invention a switch may be used for switching on the indicating device, which switch is actuated in dependence upon an action for bringing the camera into readiness for exposure, for example, opening the case. In order to enable the indicating device to be switched off, when making exposures for which knowledge of the exposure time is of no significance, the invention provides for the switch to be lockable in its switched-off position by means of an additional locking device.

Reference should now be made to the accompanying drawings, in which:

FIG. 1 is an illustration of part of a lens shutter in the cocked position, the driving mechanism of which, serving the reciprocating movement of the shutter blades, is adapted to cooperate with a time-dependent and electromagnetically actuatable locking device, FIG. 2 shows the wiring diagram of an electronic timing device which is optically connected into circuit by means of a test button to indicate the exposure time relative to a certain limit value, FIG. 3 is a schematic illustration of the accommodation of the switch arrangement actuable by means of the test button, and the indicating lamps, in a camera housing shown only partly, FIG. 4 is an alternative arrangement for connecting the indicating device by means of a switch arrangement actuated by means of the camera release, FIG. 5 shows the indicating device switched off during the period of exposure by means of a switch arrangement controlled by the shutter blade actuating ring, FIG. 6 is a wiring diagram of an electronic shutter timing device in conjunction with a switch arrangement as shown in FIGS. 4 and 5 for controlling the indicating device, FIG. 7 shows means influencing the device serving to switch on the indicating device by the ever-ready case of the camera, in a position in which the circuit of the potential source is broken.

Reference is now made to the arrangement shown in FIG. 1. Numeral 1 designates a shaft which is mounted so as to be conventionally rotatable and 2, the driving disc of the shutter driving mechanism. The driving disc 2 is subject to the action of a driving spring 3 arranged on shaft 1, which exerts a clockwise torque to the shaft. To retain the driving disc 2 in the cocked position shown in FIG. 1, a pivotally mounted lever 4 subjected to spring action is provided. This lever co-operates at one end with a projection 2a of the driving disc 2 and at the other end with a release lever 5, which is actuated by means of the release button 6 of the camera indicated in this illustration by broken lines. The lever 5, which is subject to the influence of a coil spring 7, co-operates with a further lever 8 mounted rotatably on an axle 9. By means of a bent-over flap 8a the lever 8 is caused to abut against the release lever 5 under the action of a coil spring 10. Both springs 7 and 10 exert a clockwise torque on the levers 5 and 8, which torque is absorbed by a stop 11 arranged in the movement region of the release lever 5. The drawing shows that the driving mechanism for the pivotally mounted shutter blades 12, of which the drawing only shows one, is a crank drive, the sector ring 13 being in operating engagement with the driving disc 2 by means of a driving pawl 14.

The above shutter driving mechanism co-operates with an electronically controlled timing device, the circuit of which is shown in detail in FIG. 2. This apparatus serves to control a locking device to be explained in detail hereafter, which device locks the shutter driving mechanism in the open position of the shutter blades 12 over a long or short time period. The locking device has an armature lever 16 rotatably mounted on a fixed pin 15, which carries a resiliently supported strap 17 at one end and at the other end is connected by means of an articulated coupling rod 18 to the armature 19 of an electromagnet M. The armature lever 16 has associated therewith a fixedly mounted two-armed catch lever 20 bent at right angles, one lever arm 20a of which is adapted to co-operate with a shoulder 16a of the armature lever 16 and the other lever arm 20b of which co-operates with the flap 2b of the driving disc 2. This operates so that the flap when reaching the open position of the shutter blades 12, strikes against the lever arm 20b causing the disc 2 to be locked for the duration of the functional sequence of the timing device to be explained in detail later. Owing to the cocked position of the shutter shown in FIG. 1, the armature 19 is supported against the electromagnet M by means of co-operation of the driving disc 2 with the armature lever 16, and a return spring 21 engaging the armature lever is subjected to increased tension. By means of this spring the armature lever 16 is rotated anti-clockwise as soon as the electromagnet M is de-energised. This causes the catch lever 20 to lose its support against the armature lever 16, so that the driving disc 2 rotates this lever anti-clockwise and hence continues its movement cycle and closes the shutter again.

FIG. 1 also shows that the release mechanism has associated therewith an actuating lever 24 supported against the lever 8 under action of a spring 23, which lever is mounted on a fixed pin 25 and serves to operate a contact switch $S_1$ actuated in synchronism with the release of the shutter driving mechanism and comprising a plate and a fixed pin. The object of this switch is to close the circuit of a current source 26 of an electronic timing device during the release of the camera. As further shown the circuit in FIG. 2, the electronic timing device, which is a relaxation circuit, comprises a capacitor C, a photoelectric resistance F variable as to its ohmic resistance value in dependence upon the lighting conditions, a control transistor $T_1$ and a further transistor $T_2$ connected before the electromagnet M. In a separate circuit a further contact switch $S_2$ is arranged which, as shown in FIG. 1, may be formed of two flat springs and which is retained in a closed position by means of a pin 13a arranged on the sector ring 13 in the cocked position of the shutter blade driving mechanism until the sector ring moves from normal for the purpose of moving the shutter blades into their open position.

To notify the person taking a photograph, before exposure, as to whether the exposure time required on account of the prevailing lighting conditions, is, say, less than $\frac{1}{30}$ sec., this being a time suitable for hand-held exposures, the electronic timing device has associated therewith an indicating device also operating electronically, which includes one or two lamps such as 30 and 31 which are connected to the circuit of the electronic timing device by means of a switch arrangement described in detail later. Both lamps 30 and 31 have a transistor $T_2$ or $T_3$ associated therewith, of which as shown in the embodiment of FIG. 2 the transistor $T_2$ is also a component of the electronic timing device. Furthermore it is evident from the figure that a resistance R is connected in an additional circuit which is in series with the photoelectric resistance F of the timing device by means of a switch $S_3$. The two resistances form a voltage divider to the central tap of which the control transistor $T_1$ is connected. A further switch $S_4$ serves the purpose of connecting the two lamps 30 and 31 to the voltage source 26 of the electronic timing device; the two lamps may also be connected to the collector circuit of the transistors $T_2$ and $T_3$ by switches $S_5$ and $S_6$. Since all the switches $S_3$, $S_4$, $S_5$ and $S_6$ have always to be moved simultaneously from the switch position indicated in FIG. 2 into another, when connecting the lamps 30 and 31 in the circuit of the electronic timing device, a test button 32 acting on all switches is provided, which in FIG. 2 is indicated schematically. With reference to the two switches $S_3$ and $S_5$ these are formed as change-over devices and consequently each have two non-moving contacts. Switch $S_3$ serves the alternative connection of the photoelectric resistance F with the capacitor C or the resistance R, and switch $S_5$ the alternative connection of the collector circuit of the transistor $T_2$ to the electromagnet M or the lamp 30.

FIG. 3 shows how the test button 32 serving the simultaneous actuation of the switches $S_3$ to $S_6$ is located in a camera for simple and reliable manipulation. The test button is shown as an actuating lever rotatably mounted on the rear wall of the camera housing, which lever, by means of a pin 32a, acts against a connecting rod 34 subjected to the action of a compression spring 33 and guided axially in the camera housing. The connecting rod 34 may be provided with several stops 35 for the purpose of the switch actuation which, when the test button 32 is actuated together with the rod connected to it, moves the individual switches into one contact position and/or out of a former contact position. FIG. 3 also shows that the two lamps 30 and 31 of the indicating device are visible in the additional windows 39 and 40 formed in the upper surface of the cover 38 of the camera, or may be reflected by means of a prism 41 in the luminous frame view finder 42 of the camera. The lamps 30 and 31 may be so chosen that they may light up in different colours. For example, the lamp 30 could show red, and the lamp 31 green. With reference to the exposure time limit value of, for example, 1/30 sec., the electronic circuit, i.e. the voltage divider formed by the photoelectric resistance F and the resistance R, may be so biased that the green lamp 31 lights up if the determined exposure time lies below the limit value, whilst the red lamp 30 lights if the lighting conditions are so bad that only exposure times are possible which lie above the limit value of 1/30 sec.

The mode of operation of the electronic timing devices and indicator is briefly explained below.

If the person taking a photograph wishes to be certain before exposure as to whether the exposure time obtainable on account of prevailing lighting conditions lies below or above a certain exposure time value, e.g. 1/30 sec., then on aligning the viewfinder on the object he depresses the test button 32. The result of this is that all the switches $S_3$ to $S_6$ are changed over, $S_3$ being connected to the resistance R, $S_4$ being closed, $S_5$ being connected to the "red" lamp 30 and finally, $S_6$ connected to the circuit of the "green" lamp 31. This changeover of $S_3$ causes a voltage divider to be formed of the photoelectric resistance F and the resistance R, the divider being so dimensioned that the transistor $T_1$ draws current in the event of a lighting intensity which would cause the charging of the capacitor C via the photoelectric resistance F in a shorter time, i.e. a time lying below the exposure time limit value. If such favourable lighting conditions prevail, the transistor $T_1$ is conductive, whilst transistor $T_2$ is not, so that current transverses the transistor $T_3$ resulting in the "green" lamp 31 lighting. If the lighting conditions are unfavourable so as to require a long exposure time, i.e. a time longer than the limit value of 1/30 sec., then the two transistors $T_1$ and $T_3$ are both non-conductive, whilst $T_2$ is conductive, so that the "red" lamp 30 lights up.

Assuming that the lighting conditions are such that the green lamp 31 lights up and hence an exposure can be hand-held, it is first necessary to release the test button 32, whereby the switches $S_3$ to $S_6$ return into their original position shown in FIG. 2; here switch $S_3$ connects the photoelectric resistance F with the capacitor C and switch $S_5$ the collector circuit of the transistor $T_2$ with the electromagnet M, whilst the switches $S_4$ and $S_6$ are open.

If the person taking a photograph now actuates the camera release 6, then at the same time as the driving disc 2 is released by the stop lever 4, the contact lever 24 is moved by means of the stop lever 4 and hence the switch $S_1$ is closed and owing to the opening movement of the shutter blade ring 13 the switch $S_2$ is opened. This causes the transistor $T_2$ to become conducting and the control transistor $T_1$ to be suppressed, since its base is at first at emitter potential. The current in the transistor $T_2$ causes the electromagnet M to be excited and consequently the stop device or the catch lever 20 is retained in a "stop" position. The capacitor C is now charged via the lighting-dependent photoelectric resistance F until the potential of the base of the transistor $T_1$ has increased to such an extent that it becomes conductive. At this instant the feedback to $T_2$ causes the current through $T_1$ to increase suddenly, whilst the current through $T_2$ drops to zero. Consequently the electromagnet M is de-energized, whereby the stop device associated with the shutter driving mechanism is removed. The armature lever 16 influenced by the return spring 21 moves upwardly (FIG. 1) thereby removing the catch lever 20 support, which in turn releases the shutter driving mechanism to transfer the shutter blades 12 into the closed position. If subsequently the drving disc 2 is again brought into the cocked position, then the catch lever 20, biased by its spring, returns into the original position determined by fixed pin 46, whilst the cam 2c provided on the driving disc 2 acts on the resiliently supported strap 17 of the armature lever 16 and hence simultaneously causing the armature 19 to be held against the electromagnet M.

As shown by the embodiments in FIGS. 4 to 7, the actuation of the switches of the indicating device may alternatively be effected by means of a press-stud 47 which automatically connects the indicating lamps 30' and 31' during opening of the ever-ready case 48 of the camera, by actuation of the switch $S_4$. For this purpose the stud 47 is guided axially, and subjected to the action of a compression spring 49. The arrangement is also such that the stud 47 is depressed with the ever-ready case 48 in a closed state and when the case is opened, it assumes the contact position shown in FIGS. 4 and 5. As a result the electronic indicating device is automatically connected to the voltage source 26', so that either the "red" lamp 30' or the "green" lamp 31' lights up in dependence on the prevailing lighting conditions. Such a development of the indicating device in comparison with the embodiment shown in FIGS. 1 to 3 involves some switching change, since the circuit of the lamps 30' or 31', permanently lit before making an exposure, has to be broken for the duration of the exposure.

In the arrangement shown in FIG. 4 the lamp circuit may be broken or the electronic timing device switched on in dependence upon the actuation of the camera release 6'. For this purpose, the latter as shown in FIG. 3, is provided with stops 35', which in turn co-operate with the switches $S_3$, $S_5'$ and S , in such a manner that, when the release 6' is depressed, the switch $S_6$ is opened and $S_3$ and $S_5'$ are moved from their former contact positions into another contact position. This in turn, as shown in the circuit of FIG. 6, results in that on change-over of the switch $S_3$, the electric connection of the photoelectric resistance F to the resistance R is broken and moved to the circuit of the capacitor, whilst by actuating switch $S_5$, the electromagnet M is now connected in the collector circuit of the transistor $T_2$, instead of one of the lamps 30', 31. Since the camera release 6' simultaneously actuates the switch $S_1$, not shown in FIG. 4, the electronic timing device is connected to battery potential. Subsequent actions are as the circuit sown in FIG. 2.

To prevent the person taking a photograph from being presented with unnecessary indications when making certain exposures, for example flash exposures, a stop is associated with the stud 47, by means of which it is locked in the depressed position, i.e. in the position in which the elements of the switch $S_4'$ have no contact. The stop may be actuated by hand or by an adjusting member of the camera or as shown in FIG. 4 by a rotatable disc 50 which has a recess 50a on its periphery adapted to the cross-sectional shape of the stud 47, and having a setting mark 51 for the purpose of adjusting the stop opposite one or the other switching positions designated in detail by O and R. If the stop shown in FIG. 4, after prior depressing of the stud 47, is shifted into the switching position R, the disc 50 moves to a position in front of the end face of the stud and hence prevents it from emerging from the camera housing and then prevents the switch $S_4'$ from being transferred into the contact position.

According to the embodiment shown in FIG. 5 the switch arrangement may be actuated by means of a released member of the shutter driving mechanism, for example, by means of the shutter blade driving ring 13''. For this purpose the switches $S_2''$, $S_3''$, $S_5''$ and $S_6''$ are arranged on the base plate and actuated by the pins 13a'' or the like during shutter operation so that at the beginning of the shutter movement the switch $S_6''$ is opened and the two switches $S_3''$ and $S_5''$ are changed over and finally the switch $S_2''$ opened. When using such a switch arrangement controlled by the shutter blade ring 13'', the person taking a photograph does not notice that during the exposure the indication is cancelled, since the shutter blade ring at the end of its movement returns the switches

We claim:

1. A photographic camera shutter comprising an electronic timing device therefor, a photoelectric resistor adapted to control said timing device in dependence upon the lighting of a subject, an electronic indicating device, switch means connecting said indicating device in the circuit of said electronic timing device, said indicating device showing whether said exposure time required by the prevailing lighting conditions lies below a predetermined exposure time, a resistor in said indicating device connectable to said photoelectric resistor to form a potential divider, a center tap between said two resistors, and a control transistor connected to said center tap, said indicating device comprising two lamps, a transistor connected to each lamp, connections from each transistor to said control transistor, and means for lighting one lamp for an exposure time lying below a predetermined time limit, and for lighting the other lamp for an exposure time lying above said limit.

2. A shutter as recited in claim 1, in which said control transistor and at least one of said transistors serving to supply said indicating lamps are components of said electronic timing device.

3. A shutter as recited in claim 1, with a lamp of one colour for one indication and a lamp of another colour for another indication.

4. A shutter as recited in claim 1, characterised in that said indicating lamps are located so as to be visible in an observation window or in a viewfinder.

5. A shutter as recited in claim 1, characterised by optical means associated with said lamps and conveying their indications to a viewfinder.

6. A shutter as recited in claim 1, and having switch means adapted to light said lamps permanently, together with means for breaking the circuit only for the duration of an exposure.

7. A shutter as recited in claim 6, comprising means for breaking the said lamp circuit and switching in said electronic timing device automatically in dependence upon the actuation of the camera release means.

8. A shutter as recited in claim 6, comprising means for actuation of said switch arrangement by a member of the shutter driving mechanism in the first phase of the shutter opening movement, and before the beginning of the timing period of said electronic timing device.

9. A shutter as recited in claim 6, comprising means for operating the switch connecting said indicating device to the source of energy in dependence upon a movement necessary to bring the camera into a condition for exposure.

10. A shutter as recited in claim 9, comprising a locking device for locking said switch in its switched-off position.

References Cited

UNITED STATES PATENTS

| | | | |
|---|---|---|---|
| 3,397,629 | 8/1968 | Mori, et al. | 95—10 |
| 3,418,479 | 12/1968 | Schmitt. | |
| 3,425,328 | 2/1969 | Ichijo et al. | 95—10 |
| 3,452,656 | 7/1969 | Ruhle et al. | |

NORTON ANSHER, Primary Examiner

J. F. PETERS, Jr., Assistant Examiner

U.S. Cl. X.R.

95—53; 250—206; 317—124.